United States Patent [19]

Tromp

[11] 3,771,140

[45] Nov. 6, 1973

[54] STORAGE CONFIGURATION COMPRISING SHIFT REGISTERS

[75] Inventor: Hendrik Henricus Maria Tromp, Beekbergen, Netherlands

[73] Assignee: U.S. Phillips Corporation, New York, N.Y.

[22] Filed: Mar. 16, 1972

[21] Appl. No.: 235,299

[30] Foreign Application Priority Data

Mar. 20, 1971 Netherlands ........................ 7103773

[52] U.S. Cl. ............................................ 340/172.5
[51] Int. Cl. ......................... G06f 13/02, G06f 13/06
[58] Field of Search ................................ 390/172.5

[56] References Cited

UNITED STATES PATENTS

| | | | |
|---|---|---|---|
| 3,404,377 | 10/1968 | Frankel | 340/172.5 |
| 3,251,041 | 5/1966 | Chu | 340/172.5 |
| 3,275,991 | 9/1966 | Schneberger | 340/172.5 |
| 3,292,152 | 12/1966 | Barton | 340/172.5 |
| 3,337,851 | 8/1967 | Dahm | 340/172.5 |
| 3,466,613 | 9/1969 | Schlaeppi | 340/172.5 |
| 3,525,081 | 8/1970 | Flemming | 340/172.5 |
| 3,585,600 | 6/1971 | Saltine | 340/172.5 |
| 3,248,528 | 4/1966 | Campeau | 340/172.5 X |
| 3,116,410 | 12/1963 | Manna | 340/172.5 |

*Primary Examiner*—Paul J. Henon
*Assistant Examiner*—Sydney R. Chirlin
*Attorney*—Frank R. Trifari

[57] ABSTRACT

A storage configuration comprising a shift-register store having at least *k* circulating shift registers, each shift register having *n* bit locations for storing *n* words having a length of *k* bits, a write-read location, a clock pulse source for supplying clock pulses for controlling the shift-register store, and furthermore comprising selection means for selecting words from the storage configuration on the basis of externally applied selection information, the storage configuration furthermore comprising, in order to reduce the mean access time, an auxiliary shift-register store which can be connected to the shift-register store via gates and which comprises at least *k* circulating shift registers, each shift register having *m* bit locations, *m* being smaller than *n*, for storing *m* words, in particular those *m* words stored in the storage configuration for which requests are repeatedly received, the clock pulse source supplying pulses for controlling the auxiliary shift-register store such that result of a selection in the storage configuration is usually a word directly from the auxiliary shift-register store. It is furthermore possible to use priorities as regards the question which words will be stored or not, or will remain stored or not, in the auxiliary shift-register store.

10 Claims, 3 Drawing Figures

STORAGE CONFIGURATION COMPRISING SHIFT REGISTERS

The invention relates to a storage configuration comprising a shift-register store having at least $k$ circulating shift registers, each shift register comprising $n$ bit locations for storing $n$ words having a length of $k$ bits, a write-read location, a clock pulse source for supplying clock pulses for controlling the shift-register store, and furthermore comprising selection means for selecting words from the storage configuration on the basis of externally applied selection information.

Shift-register stores of this kind, forming fields for information storage when the shift registers are arranged in groups adjacent to each other, because increasingly important as progress is made in integration techniques for medium and large-scale integration. Other forms of high-capacity shift-register stores are feasible such as, for example, wall-domain stores. Furthermore, delay lines, drum and disc stores are also to be considered as shift-register stores to which this invention relates. The achievable shift rates and/or the high storage capacity are reasons why these shift-register stores are finding an increasingly larger field of application. One obvious drawback of the shift-register stores is the fact that the mean access time is determined by half the number of bit locations in the shift register, for example $10^4/2$, multiplied by the shifting time per stage which may amount to, for example, 10 ns in the case of an integrated shift register so, for example, $½ \cdot 10^4 \times 10$ ns is 50 $\mu$s. In rotary stores, the latter is determined by the speed of rotation. This means that, in spite of a high shifting rate or rotation speed, the access time is comparatively long.

The invention has for its object to reduce the mean access time in the above-mentioned shift-register store. In order to achieve this object, the storage configuration according to the invention comprises, in order to reduce the mean access time, an auxiliary shift-register store which can be connected to the shift-register store via gates and which comprises at least $k$ circulating shift registers. Each shift register having $m$ bit locations, $m$ being smaller than $n$, for storing $m$ words, in particular those $m$ words stored in the storage configuration for which external requests are repeatedly made. A clock pulse source supplying pulses for controlling the auxiliary shift-register store such that, the result of a selection in the storage configuration is mostly a word directly from the auxiliary shift-register store.

The use of said auxiliary shift register store is advantageous because in given practical situations and/or at given instants, some words of a store are used more often than other words. The selection information may be address information or also other informations. It is feasible that given bits of words of the shift register store contain a characterizing information on the basis of which such a word can be selected. For example, bits describing a given name. These bits thus enable searching of the word containing that name. Consequently, not only address associations are possible for selection, but also other associations, whether or not simultaneously present in the system.

In order to make selection as efficient as possible, it is not sufficient to use selection means which consist merely of one comparison unit for the entire storage configuration; according to a further embodiment according to the invention, the selection means for selecting words from the storage configuration preferably consist of a first comparison unit in which the externally applied selection information is compared with information in the shift register store, and a second comparison unit in which the externally applied selection information is compared with information in the auxiliary shift-register store. A relevant word in the storage configuration is selected upon detection of agreement in said first or second comparison unit, after which the word can be applied to an output register.

If in particular, address association is involved, it is not necessary that the address is entirely stored in the shift-register store. This is because the location of a word in a shift-register store can be laid down by the position of an address counter which follows the shift-register store.

In a storage configuration according to the above-mentioned aspect, the means for selecting words from the shift-register store of the storage configuration, can comprise an address register for storing externally applied addresses, an address counter which is supplied by said clock pulses, the addresses of the words stored in the shift-register store thus being determined, and a first comparison unit for determining agreement between an address in the address register and the address counter. This configuration according to the invention being characterized in that the auxiliary shift-register store comprises a field of at least $k + 1$ registers for storing the said $m$ words having a length of $k$ bits, and the addresses in the shift-register store, associated with these $m$ words and having a length of 1 bits. A second comparison unit signals the agreement between an address in the address register and an address stored in the auxiliary shift-register store. A relevant word in the storage configuration is selected when agreement in said first or second comparison unit is signalled, after which the word can be applied to an output register.

In the simplest construction of the storage configuration according to the invention, a word can also be stored, if desired, in the auxiliary shift-register store directly, when it is stored in the shift-register store. On the other hand, it is alternatively possible that a word which is already present in the shift-register store is not stored in the auxiliary shift-register store until the word in the shift-register store is requested. If in the one, and/or in the other case, the auxiliary shift-register store is entirely occupied, a new word to be stored can be written on a previously stored word. Such a word can be erased by returning it to the shift-register store in advance.

When a word is being treated in a calculating or other data process, the word is capable of being requested quite a number of times in succession within a brief period of time. The actual chance is completely dependent of the programme. When the relevant word is present in the auxiliary shift-register store, it will be found at least as many times faster because this auxiliary shift-register store ($n/m$) is shorter than the shift-register store itself, it being assumed that both stores have the same shift rate. If $n = 10^4$ and $m = 256$ in the above example, the mean access time for that word will be approximately 40 times smaller, i.e. $256/2 \times 10$ ns $= 1.28$ $\mu$s. Because $m = 256$, (in this case) 256 words can be found with this substantially reduced access time.

The question now becomes which $m$ of the $n$ words of the shift-register store are most likely to be requested. If this is known in advance, this can be taken into account. To this end, the storage configuration according to the invention is also characterized in that priority information of information words or addresses is present. A provided priority unit enbles determination of which number $m$ of the $n$ number of information words of the shift-register store can be stored in the auxiliary shift-register store. This is accomplished on the basis of the priority information. It is thus determined, which words can be most advantageously stored in the auxiliary shift register store, so as to achieve a mean access time which is as small as possible.

It is alternatively possible to use other criteria for determining which words are to be stored in the auxiliary shift-register store, words previously stored in the auxiliary shift-register store being erased or returned to the shift-register store if the auxiliary store is completely full.

To this end, the storage configuration according to the invention is characterized in that the auxiliary shift-register store consists of at least $k+p$ or $k+1+p$ shift registers, respectively. At least the one $p$ bit of the $m$ words present, serves for the storage of priority information, to be determined in a priority generator according to a given algorithm on the basis of the fact that a word is being repeatedly requested. This priority is decisive as regards the relevant word which remains stored in the auxiliary shift-register store of which is returned to the shift-register store. The said algorithm may be an algorithm of the kind where, when a new word is written in the auxiliary shift-register store, for example, the word which has remained unused for the longest period of time is erased or is returned to the shift-register store.

Another feasible algorithm may be an algorithm where, when a new word is written, the word which has been requested the least number of times is erased or returned.

It is to be noted that said storage configuration, particularly if the shift-register store and the auxiliary shift-register store are of the same kind, can be advantageously constructed, possibly together with other parts of the configuration, as one assembly using integrated techniques.

In practice, it will often occur that shift registers are used in the storage configuration where the shift rate of the auxiliary shift-register store is a factor $c$ larger than that of the shift-register store, the number of words of the auxiliary shift-register store being equal to the factor $c$.

It is thus possible to use large, inexpensive but comparatively slow shift-register stores, for example, magnetic bubble shift-register stores, drum stores, or disc stores. The auxiliary shift-register store on the other hand, can be composed of fast, small and comparatively expensive shift registers. Due to the choice of the factor $c$, the difference in capacity of the two stores imposes no problems, the risk of synchronization errors is substantially precluded, and a word present in the auxiliary shift-register store will always be found faster than in the shift-register store itself, assuming that the word is still stored therein. This is of importance, as otherwise a word is liable to be stored in the auxiliary shift-register store a number of times. This would be very inefficient, as in that case, for example, other frequently used words will not find space in the auxiliary shift-register store. Assume, by way of example, that there is a comparatively slow shift-register store having $2.10^5$ words, and a shift rate of 1 $\mu$s per step; the means access time thereof is then 100 ms. Assume, also, by way of example, that there is an auxiliary shift-register store having a rate of 10 ns, the contents of the latter store being circulated once during one step of the large shift-register store, i.e. $m=c= 1\mu s/10$ ns = 100 words. The auxiliary register store then has a mean access time of 0.5 $\mu$s. Furthermore, assuming that the chance that a word to be requested is present in the auxiliary shift-register store is about, for example 85 percent; the overall mean access time for these $2.10^5$ words is then: $0.8^5 \times 0.5\ \mu s + 0.15 \times 100$ ms = 15 ms, or an improvement by a factor of 7.

The invention will be described in more detail hereinafter, with reference to the following drawings.

It is to be noted, that the said figures show only examples of feasible embodiments. Other like arrangements are feasible, such as in the case of a drum or disc store where the shift registers are formed by the tracks on the drum, or by corresponding tracks on the discs.

Figure 1:
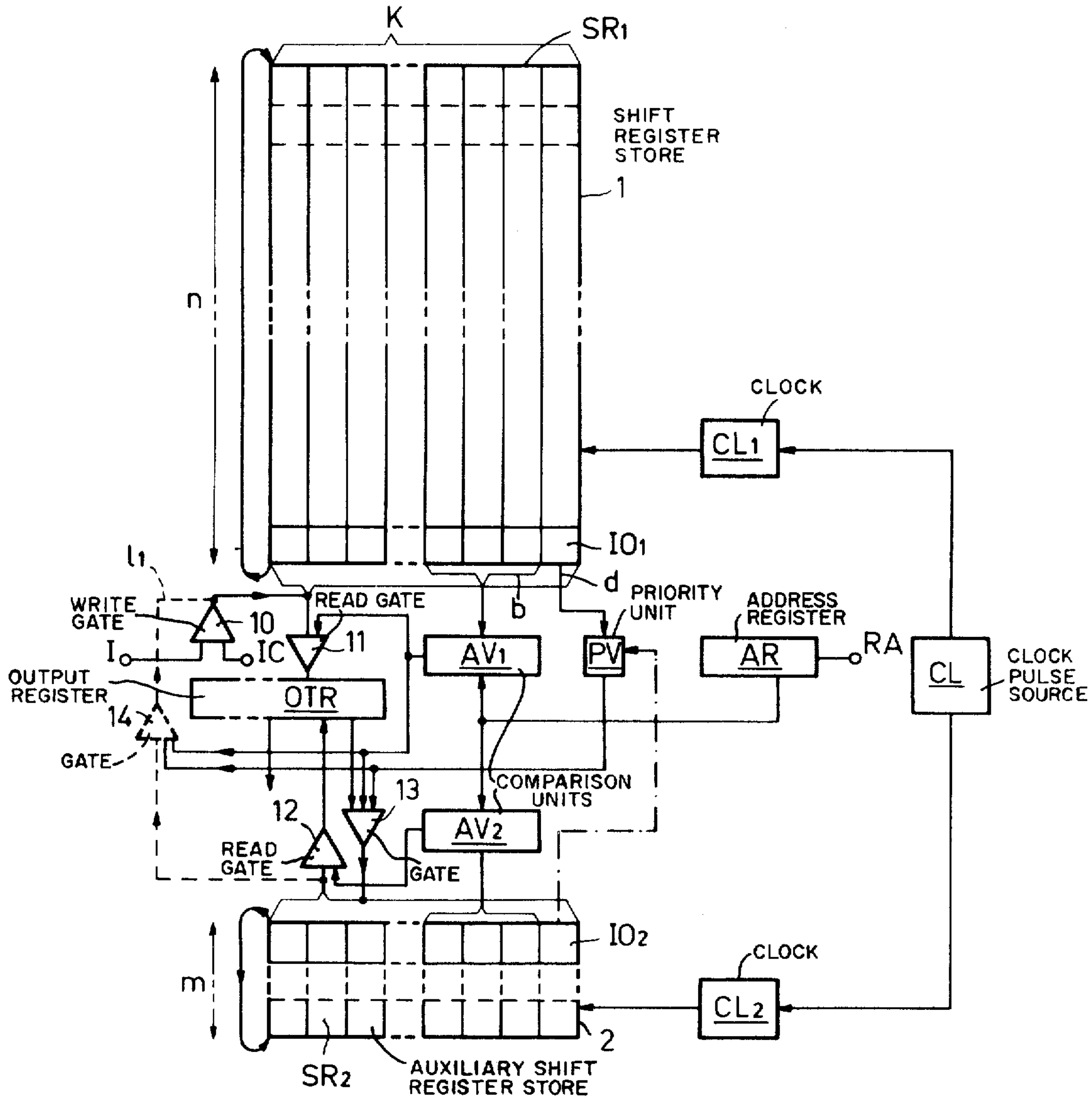
FIG. 1 shows a first embodiment of a storage configuration according to the invention.

The reference numeral 1 in FIG. 1 denotes a circulating shift register store having a field of $k$ shift registers SR1. Each shift-register SR1, which itself may consist of a series of sub-shift-registers again, has $n$ bit locations. The location I01 is the write-read location. The reference numeral 2 denotes a circulating auxiliary shift-register store comprising a field of $k$ shift registers SR2. Each shift register SR2 comprises $m$ ($<n$) bit locations. The location I02 is the write-read location of store 2. CL is a clock pulse source which supplies, whether or not after frequency division (or multiplication), the clock pulses for the stores 1 and 2 in CL1 and CL2, respectively. This may be effected continuously (dynamic shift register) or only if searching takes place (static shift register). In the figure the words are horizontally arranged in the stores. Their length is $k$ bits. In this example, words are written in store 1 in series form or preferably parallel across a write-gate 10 (which, of course, comprises as many gates for parallel processing as there are bits in the word) of the input I in reaction to a write command on terminal IC. Assume that in this example, the words themselves contain information on the basis of which these words can be selected. This may be address information, whether or not according to a given sequence, but also other information (for example, a proper name and the like). Assume that the designated bits $b$ of the words contain this association information. If a given word is then requested, this association information is applied to a register AR via terminal RA. This register AR supplies this information to a first comparison unit AV1 which serves as a selection means for store 1, and to a second comparison unit AV2, which serves as a selection means for signalling agreement between said externally applied association information and corresponding information in the store 2. If the requested word is present in store 2, this can be rapidly found (because $m<n$).

If the clock pulse frequency for store 2 is a factor of $c$ times higher than that for store 1 (i.e. store 2 is $c$ times faster than store 1) and $m = c$, it is sure that, if the requested word is in store 2, this word will first be there. AV2 then supplies a signal, in reaction to which the read gate 12 (the same is applicable as to gate 10) allows the relevant word to pass and supplies it to an output register OTR. In that case, the word is not lost from the store 2. If the word was not (yet) in store 2, it will be found, generally after a longer period of time, in store 1. AV1 subsequently supplies a signal in reaction to which the read gate 11 (also constructed as 12) allows the relevant word to pass, and supplies it to the register OTR. The word then also remains present in store 1. At the same time, the comparison unit AV' can also supply a signal to gate 13 (also constructed as 11 and 12) in order to ensure that the requested, and now found, word in store 1 is also transferred to the store 2. It may then be that the word disappears, or does not disappear, from the store 1, depending on what is desired in practice. This word is then written in store 2, for example, in an empty location, or it replaces an already present word which, if desired, can be taken up in store 1 again, see dotted line L1 via which the word is transported via a gate 14. If gate 14 is required, it is controlled, like gate 13, from AV1 and PV → (see hereinafter). In FIG. 1, an extra facility is incorporated: the gate 13 allows a word to pass to store 2 only if approval has been obtained from a priority unit PV. This approval can be given on the basis of information, originating for example, from the processor. In this example, however, the words have a bit (or bits) *d* in which it is specified whether or not a word is qualified to be stored in store 2. If a word is in the read location 101, and AV1 indicates that the requested agreement of information is present, and it is detected in PV that the word qualifies for storing in store 2, the latter will indeed be effected. This procedure can be further extended in the sense that the priority unit can also serve for comparing the bit(s) *d* in a word of store 1 with the bit(s) *d* of words already present in the store 2. If a word selected from store 1 has a high priority (for example, a higher binary numerical value) than one or more words in the store 2, this word may erase one of those other words (for example, the word having the lowest binary numerical value). If necessary, the latter word can be returned to store 1 via gate 14. This possibility is denoted in FIG. 1 by a stroke-dot line between 102 and PV. Such a comparison of the *d* bit(s) of the words in the store 2 with the *d* bit(s) of a word from store 1 imposes no problem whatsoever if, as already stated above, $m=c$ or if $m = c/i$, $i$ being 1,2, . . . It is to be noted again that a priority for storing in store 2 can also be externally determined, for example, by information from the processor. For example, an applied address may comprise an additional bit which is inserted, for example in PV, this bit ensuring that, in the case of agreement between the contents of AV1 and AR, the gate 13 opens only if this bit has a 1-value.

Figure 2:
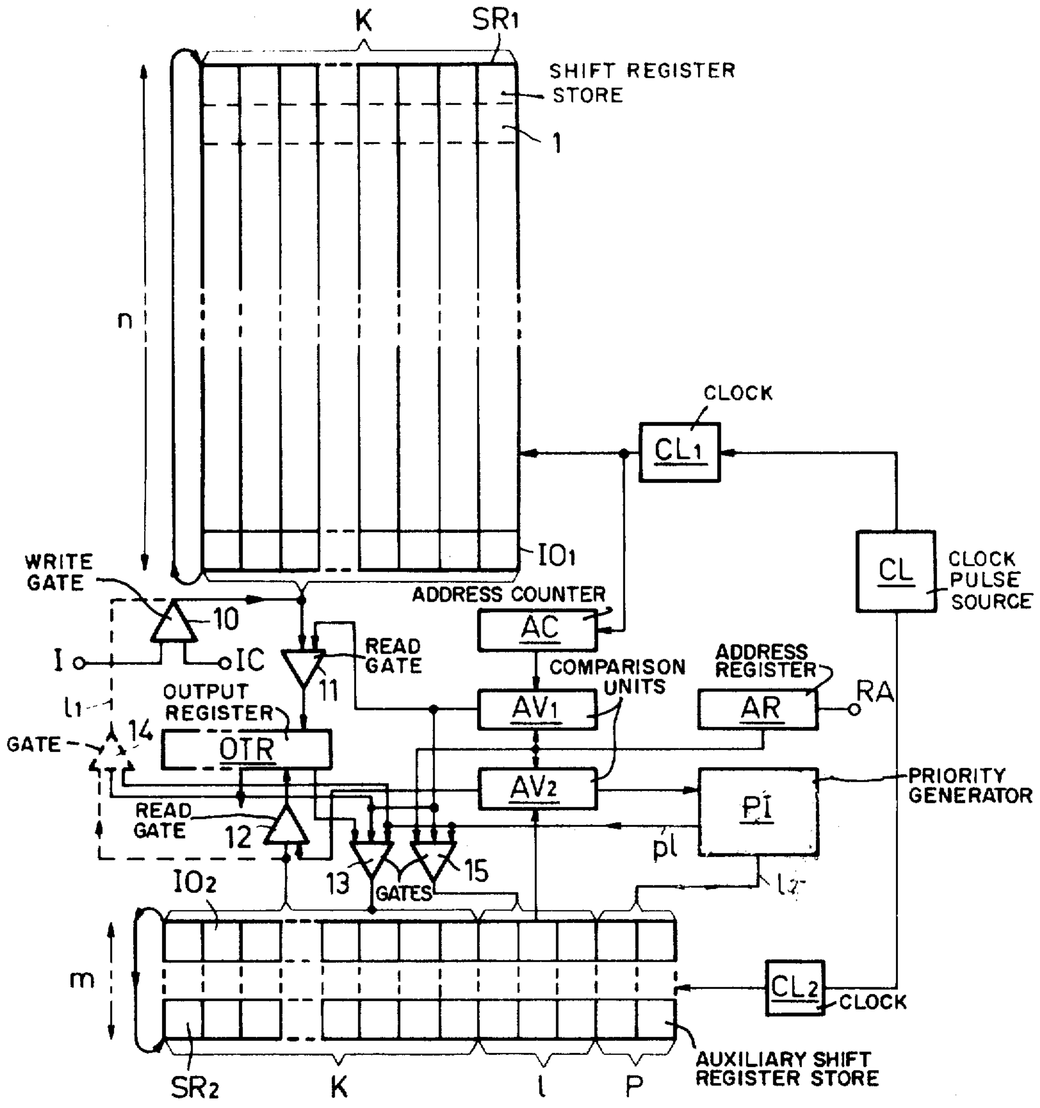
FIG. 2 shows a second embodiment of a storage configuration according to the invention.

FIG. 2 shows another embodiment of a feasible storage configuration according to the invention. Parts which are also shown in FIG. 1 are provided with the same reference numerals. Upon selection from the store 1, there is no information in the *n* words for which selection takes place. The location in the shift-register store 1 corresponds to the address of a word. An address counter AC is provided which is supplied from CL1, and hence it follows the store 1. The address of a word in location 101 is each time present in the address counter AC at that instant. If agreement exists between an externally requested address, stored in AR, and the address in the address counter AC, the comparison unit AV1 supplies a signal in reaction to which the gate 11 is opened for reading that word (which also remains in the store) from store 1 to register OTR. This signal (ignoring priorities, see hereinafter) also opens a gate 13 so that that word is also stored in store 2. It is then possible for the word to disappear from store 1. Moreover, this signal opens, (again ignoring priorities) a gate 15, so that the address of the same word arrives in the store 2 from register AR (or from AC). The address will be stored in bit location L which covers the length of such an address. When a word is searched for at a given address, this address is not only compared in AV1 but also in AV2, i.e. with the contents of the L-bits of the words in store 2. If agreement is detected, AV2 supplies a signal, thus opening gate 12 for reading that word from the store 2 to the registor OTR.

The foregoing demonstrates that, when the words occupy successive addresses in store 2, it is an advantage that the address information need not be stored therein (saving as regards storage space), but that the address counter can take over the function thereof. It is obvious that this address information must be present in the store 2, as otherwise the selection of stored *m* of *n* words is no longer possible. This embodiment also incorporates a form of priority treatment. In this case, it is not indicated or known in advance which words have a higher priority for the storing in the store 2 (this is possible, see description with reference to FIG. 1), but in this case the priority is determined, by way of example, according to a given algorithm. A priority generator PI is provided for this purpose. Via line L2, this device ensures that, for example, each time when a requested word is found in store 2, AV2 being connected to PI for supplying this agreement signal, the binary value of a priority information word comprising *p* bits and being stored in *p*-bit locations of the words in the auxiliary shift-register store 2 is increased. In this way, the number of requests for a word, up to a given maximum value, for example, 4, is recorded. If a word which is not present in store 2 is then selected from store 1, the priority circuit PI supplies a signal via line pL if this current still finds space for this word in store 2. There may still be a location where the *p*-bits do not indicate the highest binary value. If this is the case, this word is erased by the word last selected from store 1. If desired, this word to be erased can also be returned to the store 1 via gate 14 and line L1. The signal on line pL opens the already prepared gates 13 and 15 for the transport of the word from store 1 to store 2, and allows the word (*k* bits) and the associated address (L bits) to pass to store 2. The *p*-locations can then be filled, for example, with a binary 1-value.

Other algorithms are also feasible. For example, for each word in store 2 a number generated in PI may be recorded at the *p*-bit locations, the said number indicating when the word has last been requested. This may be a time indication but, more simply, it may also be an increasing number: upon each circulation of store 2, the device PI supplies a pulse for bit locations *p* of each word. The contents of the *p*-locations thus continuously increase up to a given value. When a word is not present in store 2 but is selected from store 1, the priority device PI determines in which of the words in store 2 the *p*-value is maximum, PI ensuring that this word is erased by means of a signal via line pL.

When $m=c$ (or possibly $m = c/i$), it also applies in this case, that there are no problems involved in performing the correct operations in time by means of the priority unit, during the shifting time of one step in the large shift-register store.

If the two stores of a configuration according to the invention are of the same kind, these stores can be constructed as one assembly, possibly together with all other parts of the configuration, using integration techniques.

Figure 3:
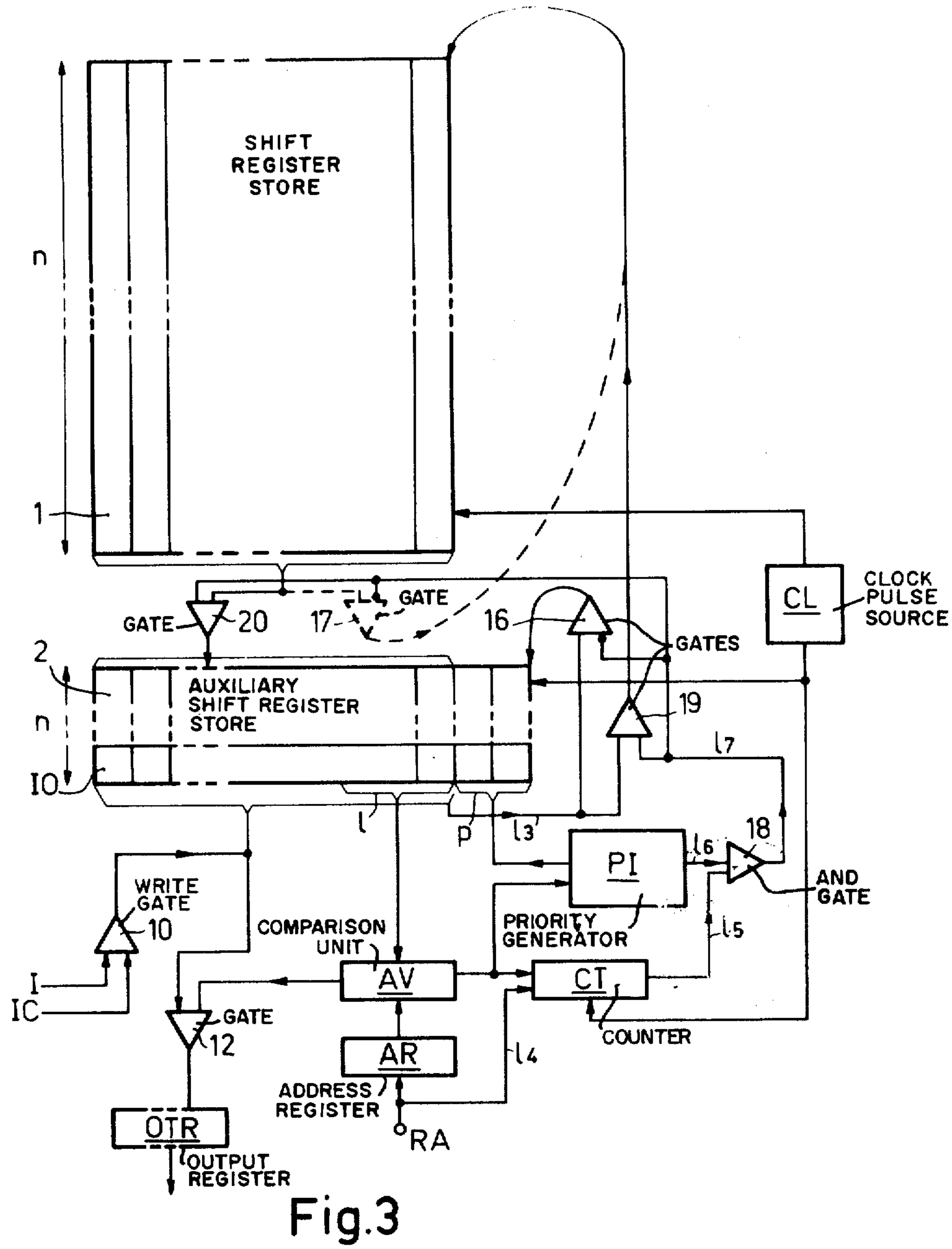
FIG. 3 shows another embodiment of a layout of a configuration according to the invention.

If the stores 1 and 2 are of the same kind, and, consequently, are controlled at the same clock pulse frequency, and if furthermore, the word address information is stored in store 1 as well as in store 2, it is possible to use selection means comprising only one comparison unit. This results in a saving of one comparison unit. However, this saving also involves a complication which may result in an increase of the means access time because, if a searched word is not stored in the auxiliary shift register store 2, it has to be transferred from store 1 before selection can be effected, Depending on the situation, a set-up of this kind may still be of useful importance for use. FIG. 3 shows an example of such a case.

The same references are used for components which are also shown in FIG. 1 and/or FIG. 2. According to the invention, if a number $m$ of frequently used words are present in the store 2, these words circulate in store 2 under the command of the clock pulses, i.e. in the figure from the top downwards (location I0) and from there via line L3 (in reality parallel, so L3 is a bundle of lines) and gate 16 back to store 2. The $n$ words in store 1 circulate therein continuously or not, depending on whether dynamic or static registers are involved, from the top downwards and, in the case of dynamic registers, return via a gate 17 (denoted by dotted line). If a word is searched for, its address is applied to address register AR and the addresses (L bits) stored in the store 2 are compared with that address in AR when they pass the write-read location I0 in comparison unit AV. When a requested address is stored in AR, a starting command is applied to counter CT via line L4. In reaction to the clock pulses from CL, this counter counts the number of words passing the location I0. Agreement of an address is signalled by AV. Gate 12 is then opened, and the requested and now selected word is applied to the output register OTR (the word also remains stored in store 2). The said signalling in AV furthermore causes the counter CT to return to its initial position (0) and, in addition, the proirity unit is thus controlled, for example, so as to increase the binary value of the priority datum in the location of the $p$-bits of the auxiliary shift-register store 2 by a value 1 (compare FIG. 2). The use of a word is thus also recorded. It is alternatively possible to record in the $p$-bits, via PI, the number of times that a word passes I0 without having been used.

If the search for a word in store 2 in the above manner does not result in a corresponding address in store 2 after one complete circulation of the store 2, the following takes place in order to enable further searching in the shift-register store 1: after one complete circulation, the counter CT will have counted to the maximum value (or to the minimum value if it started counting at the maximum value). As a result, a signal appears on line L5 which is connected to an AND-function gate 18. If it is detected in the unit PI, in which the $p$-bits of the words passing via I0 are constantly investigated, that a word passes at a given instant which has no or only a low priority, a signal appears on line L6 which is also connected to gate 18. The result is obvious: if 15 as well as L6 carry a signal at a given instant, gate 18 opens and a signal appears on line L7. Using these signals, the two word-passage gates 19 and 20 are opened, while the passage gates 16 and 17 (the latter, if present) are closed, the signal on line L7 being applied to these gates in an inverted form for this purpose (denoted by a dot). It is thus achieved that a word is transferred from store 1 to store 2 via the gate 20, while the word "dropping out" of store 2 returns to store 1 via gate 19. This process may continue until priority unit PI finds a word in store 2 having a priority such that it may not be removed from store 2. The signal on line L6 is thus cancelled, and hence also that on line L7, so that the previous situation is restored, the gates 16 and 17 then being open again and 19 and 20 being closed. If the further investigation of the words in store 2 reveals that the requested word is in the meantime present in store 2, the process continues as described above. If the word is still not present, the counter CT remains in the "full" position (counter can be reset only by a signal from AV), gate 18 will open again as soon as the priority unit grants approval, and one or more words from store 1 will arive in store 2 via gate 20. Upon arrival of words from store 1 in store 2, without these words being used because there was no request for them, they will be quickly returned to store 1. This is because the priority unit PI detects no bits on the $p$-bit locations of these words in store 2, so that PI supplies a signal on L6 etc. It is to be noted that the search for a word which initially was still in store 1 will generally be longer in this embodiment than in the embodiments according to FIGS. 1 and 2, as then searching actually takes place simultaneously in stores 1 and 2. However, for given applications, the solution shown in FIG. 3 might be of importance, even if it were only because of the saving of one comparison unit.

What is claimed is:

1. A storage configuration comprising a shaft-register store having at least a $k$ number of circulating shift registers, each shift register having an $n$ number of bit locations for storing an $n$ number of words having a length of a $k$ number of bits, and a write-read location, said storage configuration further comprising a clock pulse source connected to the shift register store for supplying clock pulses for controlling the shift-register store, and selection means for selecting words from the storage configuration on the basis of externally applied selection information, an auxiliary shift-register store for reducing mean access time, which can be connected to the shift-register store via gate means, and which comprises at least a $k$ number of circulating shift registers, each shift register having an $m$ number of bit locations, the number $m$ being smaller than the number $n$, for storing an $m$ number of words, in particular, those $m$ number of words stored in the storage configuration for which external requests are repeatedly made, said clock pulse source connected to said auxiliary shift register store for supplying pulse for controlling the auxiliary shift-register store such that the result of a selection in the storage configuration is mostly a word directly selected from the auxiliary shift-register store, the auxiliary shift-register store having a shift rate which is a factor of $c$ larger than that of the shift-register store, the number of words $m$ of the auxiliary shift-register store being proportional to the factor $c$.

2. The storage configuration as claimed in claim 1, in which the selection means for selecting words from the storage configuration consists of a first comparison unit connected to said shift register store and in which externally applied selection information is compared with information in the shift-register store, said selection means further comprising a second comparison unit connected to said auxiliary shift register in which the externally applied auxiliary information is compared with information in the auxiliary shift-register store, a relevant word in the storage configuration being selected and being ready to be supplied to an output register if agreement is signalled in said first or second comparison unit.

3. The storage configuration of claim 1, wherein the number of words $m$ of the auxiliary shift-register store is equal to the factor $c$.

4. The storage configuration as claimed in claim 1, wherein the shift-register store and the auxiliary register store are of the same kind and are capable of being constructed together with other parts of the storage configuration, as one integrated assembly.

5. The storage configuration as claimed in claim 1, further comprising a priority unit connected to said shift-register store, said priority unit containing priority information for determining which $m$ words of the number of $n$ words of said shift-register store are to be stored in said auxiliary shift-register store.

6. A storage configuration comprising a shift-register store having at least a $k$ number of circulating shift registers, each shift register having an $n$ number of words having a length of a $k$ number of bits, and a write-read location, said storage configuration further comprising a clock pulse source connected to the shift-register store for supplying clock pulses for controlling the shift-register store, and selection means for selecting words from the shift-register store, said selection means comprising an address register for storing externally applied addresses, an address counter connected to, and supplied by said clock pulse source, and a first comparison unit connected between said address counter and said addres register for signalling correspondence between an address in the address register and said address counter, said storage configuration further comprising an auxiliary shift register store connected to said clock pulse source and comprising a field of at least $k+l$ number of shift registers, each shift register of said auxiliary shift-register store having an $m$ number of bit locations for storing an $m$ number of words having a length of a $k$ number of bits, and addresses associated with these $m$ number of words having a length of $l$ bits in the auxiliary shift-register store, the number $m$ being less than the number $n$, a second comparison unit connected between said address register and said auxiliary shift register store for signalling agreement between an address in the address register and an address stored in the auxiliary shift-register store, and an output register connected between said shift-register stores for receiving a relevant word in said storage configuration dependent upon whether agreement is signalled in said first or said second comparison unit.

7. The storage configuration as claimed in claim 6, wherein the auxiliary shift-register store comprises an additional number of $p$ shift-registers, at least one $p$ bit of the $m$ words present serving for storage of priority information, said storage configuration further comprising a priority generator for determining which information has priority according to a given algorithm based upon the number of requests for a word, this priority being decisive as to whether or not a particular word remains stored in the auxiliary shift-register store.

8. The storage configuration of claim 6, wherein the shift-register store and the auxiliary shift-register store are of the same kind, and are capable of being constructed together with other components of the storage configuration as one integrated assembly.

9. The storage configuration of claim 6, wherein the auxiliary shift-register store has a shift rate which is a factor of $c$ larger than that of the shift-register store, the number of words $m$ of the auxiliary shift-register store being proportional to the factor $c$.

10. The storage configuration of claim 9, wherein the number of words $m$ of the auxiliary shift-register store is equal to the factor $c$.

* * * * *